United States Patent [19]
Kikuchi et al.

[11] Patent Number: 6,144,410
[45] Date of Patent: Nov. 7, 2000

[54] TELECINE SIGNAL CONVERSION METHOD AND AN UP-CONVERTER

[75] Inventors: Hidehiko Kikuchi; Masayuki Ishida, both of Tokyo, Japan

[73] Assignee: Nippon Television Network Corporation, Tokyo, Japan

[21] Appl. No.: 08/770,833

[22] Filed: Dec. 20, 1996

[30] Foreign Application Priority Data

Dec. 27, 1995 [JP] Japan ................................ 7-340411

[51] Int. Cl.[7] .......................... H04N 7/01; H04N 11/20
[52] U.S. Cl. ........................ 348/441; 348/443; 348/458
[58] Field of Search .................................. 348/441, 443, 348/446, 458, 459, 455; H04N 7/01, 11/20

[56] References Cited

U.S. PATENT DOCUMENTS

| | | | |
|---|---|---|---|
| 5,255,091 | 10/1993 | Lyon et al. ............................... | 348/443 |
| 5,517,248 | 5/1996 | Isoda ....................................... | 348/459 |
| 5,519,452 | 5/1996 | Parulski ................................... | 348/620 |
| 5,661,525 | 8/1997 | Kovacevicet et al. ................... | 348/448 |
| 5,734,435 | 3/1998 | Wilson et al. ........................... | 348/459 |

FOREIGN PATENT DOCUMENTS

| | | |
|---|---|---|
| 0685968 | 12/1995 | European Pat. Off. . |
| 7-95441 | 4/1995 | Japan . |

OTHER PUBLICATIONS

English–Language Abstract for Published Japanese Patent Application 7–95441.

"Digital Video Processing", *Digicipher HDTV System Description,* Aug. 22, 1991, pp. 9–23.

*Primary Examiner*—Nathan J. Flynn
*Assistant Examiner*—Vivek Srivastava
*Attorney, Agent, or Firm*—Roylance, Abrams, Berdo & Goodman, L.L.P.

[57] ABSTRACT

Telecine signal conversion method for converting an interlaced scan telecine signal generated by 2-3 pull-down system, wherein a picture of the first frame is converted into an interlaced signal of the first and second fields and a picture in the following second frame is converted into an interlaced signal in the third, fourth and fifth fields, into a progressively scanned telecine signal comprising steps of detecting a pull-down phase of the interlaced scan telecine signal, specifying the first and second fields based on the detected pull-down phase, composing picture signals of the specified first and second fields and generating progressively scanned telecine signals from the picture signals of the first and second frames, and specifying the third and fourth fields based on the detected pull-down phase, composing picture signals of the specified third and fourth fields and generating progressively scanned telecine signals from the picture signals of the third, fourth and fifth frames.

7 Claims, 10 Drawing Sheets

TELECINE SIGNAL CONVERSION METHOD AND AN UP-CONVERTER

BACKGROUND OF THE INVENTION

The present invention relates to an art of conversion for converting a television cinema signal using interlaced scanning system (referred to as an interlaced scan telecine signal, hereinafter) into a television cinema signal using sequential scanning system (referred to as a progressively scanned telecine signal), for example, an art for converting an interlaced scan telecine signal converted from a picture like an movie film of which the number of frames per second is smaller than the field frequency like into a progressively scanned telecine signal.

Conventionally, a 2-3 pull-down system has been used as an art for converting a picture obtained from a movie film and the like into a television signal.

The 2-3 pull-down system is an art for converting a picture like a movie film of which the number of frames per second is smaller than field frequency into an interlaced signal.

For example, a movie film comprises twenty-four frames per second. Conversely, a present interlaced signal comprises sixty frames per second. Consequently, simply converting a movie film picture into an interlaced signal causes a problem.

Therefore, the above-mentioned 2-3 pull-down system is used in order to convert a movie film picture into an interlaced signal. The 2-3 pull-down system is explained as follows, referring to FIG. 11. In the 2-3 pull-down system, the first frame is converted into two fields of the interlaced signal and the following second frame is converted into three fields of the interlaced signal. This sequence is repeated at intervals of 1/12 second. That is, converting two frames of the movie film into five fields of the interlaced signal is considered as one sequence for processing.

For example, in consecutive frames A, B, C, D . . . of the film in FIG. 11, picture information A on the first frame A is converted into an odd scanning line signal A1 of the picture information A to be converted into the first interlaced field I1 and an even scanning line signal of the picture information A2 to be converted into the second interlaced field I2.

Next, picture information B on the second frame B is converted into an odd scanning line signal of the picture information B1 to be converted into the third interlaced field I3, an even scanning line signal of the picture information B2 to be converted into the fourth interlaced field I4 and an odd scanning line signal of the picture information B3 to be converted into the fifth interlaced field I5.

In this manner, the following frames C, D . . . are converted.

Wide clear vision broadcasting that started in Japan on July, 1995 uses a progressively scanned signal as a signal source.

Therefore, a camera and sequential scanning VTR corresponding to sequential scanning system used for obtaining a progressively scanned signal are required. A telecine unit is also required in order to obtain a progressively scanned telecine signal from a movie film and the like.

However, a telecine unit using a sequential scanning camera is more expensive than a conventional interlaced scan telecine unit and the like, therefore no broadcasting station adopts the telecine unit with a sequential scanning camera.

SUMMARY OF THE INVENTION

It is an object of the present invention to solve the aforementioned problems.

It is another object of the present invention to provide an art for converting an interlaced scan telecine signal into a progressively scanned telecine signal without the use of an expensive sequential scanning telecine unit.

The objects of the present invention are achieved by a telecine signal conversion method for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said telecine signal conversion method comprises steps of: detecting a pull-down phase of said interlaced scan telecine signal; specifying said first and second fields based on said detected pull-down phase, composing picture signals of said specified first and second fields and generating progressively scanned telecine signals from said picture signals of said first and second frames; and specifying said third and fourth fields based on said detected pull-down phase, composing picture signals of said specified third and fourth fields and generating progressively scanned telecine signals from said picture signals of said third, fourth and fifth frames.

Furthermore, the first detection means for detecting a pull-down phase of the above-mentioned interlaced telecine signal detects the pull-down phase based on difference between a picture signal of a certain field of the interlaced telecine signal and a picture signal of two fields before the certain field. Concretely, five-field sequence (pull-down phase) is detected at the timing when the difference becomes zero.

In addition, the second detection means for detecting a pull-down phase of the above-mentioned interlaced telecine signal detects the pull-down phase based on a time code value of the interlaced telecine signal. Concretely, five-field sequence (pull-down phase) is detected based on a time code value per field belonging to the interlaced telecine signal.

Moreover, it is desirable that the pull-down phase detecting means for detecting the pull-down phase of the interlaced telecine signal detects the pull-down phase based on a difference between a picture signal of a certain field of the interlaced telecine signal and a picture signal of two fields before the certain field, generates a synchronizing signal synchronized with the detected pull-down phase based on a time code value of the interlaced scan telecine signal and uses a phase shown by the synchronizing signal as a new pull-down phase in order to detect five-field sequence (pull-down phase). Concretely, the five-field sequence (pull-down phase) is detected by the above-mentioned first means then a synchronizing signal synchronized with the five-field sequence is generated based on a time code value of the interlaced scan telecine signal. In this manner, even if the field difference does not become almost zero at intervals of five fields, that is, the same pictures are consecutive when there is possibility of mis-detection of the pull-down phase, the pull-down phase can be correctly obtained based on the synchronizing signal of the time code value synchronized with the pull-down phase.

The objects of the present invention are achieved by an up-converter for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said up-converter comprising: pull-down phase detecting means for detecting a pull-down phase of said interlaced scan telecine signal and outputting a synchronizing signal synchronized with said pull-down phase; means for specifying said first and second fields based on said synchronizing signal, composing picture signals of said specified first and second fields and generating progressively scanned telecine signals from said picture signals of said first and second frames; and means for specifying said third and fourth fields based on said synchronizing signal, composing picture signals of said specified third and fourth fields and generating progressively scanned telecine signals from said picture signals of said third, fourth and fifth frames.

Generation means for generating a picture signal of each frame can comprise, for example, memory for storing an interlaced scan telecine signal in each field and read and composition means for reading each scanning line from the stored signal and composing an odd scanning line and an even scanning line.

Moreover, the above-mentioned pull-down phase detecting means can comprise a subtraction unit for obtaining a difference between a picture signal of a certain field of the interlaced scan telecine signal and a picture signal of two fields before the certain field and outputting means for comparing the difference and a certain threshold and outputting a synchronizing signal when the difference is smaller than the threshold. It is desirable that the above-mentioned difference takes the value of a difference between picture elements of the two fields and a threshold is specified so that a synchronizing signal is output when five percent or smaller of the picture elements comprise the difference larger than five percent.

It is also desirable that the above-mentioned pull-down phase detecting means comprises a subtraction unit for obtaining a difference between a picture signal of a certain field of the interlaced scan telecine signal and a picture signal of two fields before the certain field, outputting means for comparing the difference and a certain threshold and outputting a pulse when the difference is smaller than the threshold and generation means for generating a synchronizing signal synchronized with the pulse based on a time code value of the interlaced scan telecine signal. In this manner, even if the same pictures are consecutive, the pull-down phase can be correctly obtained based on the synchronizing signal of the time code value synchronized with the pull-down phase.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
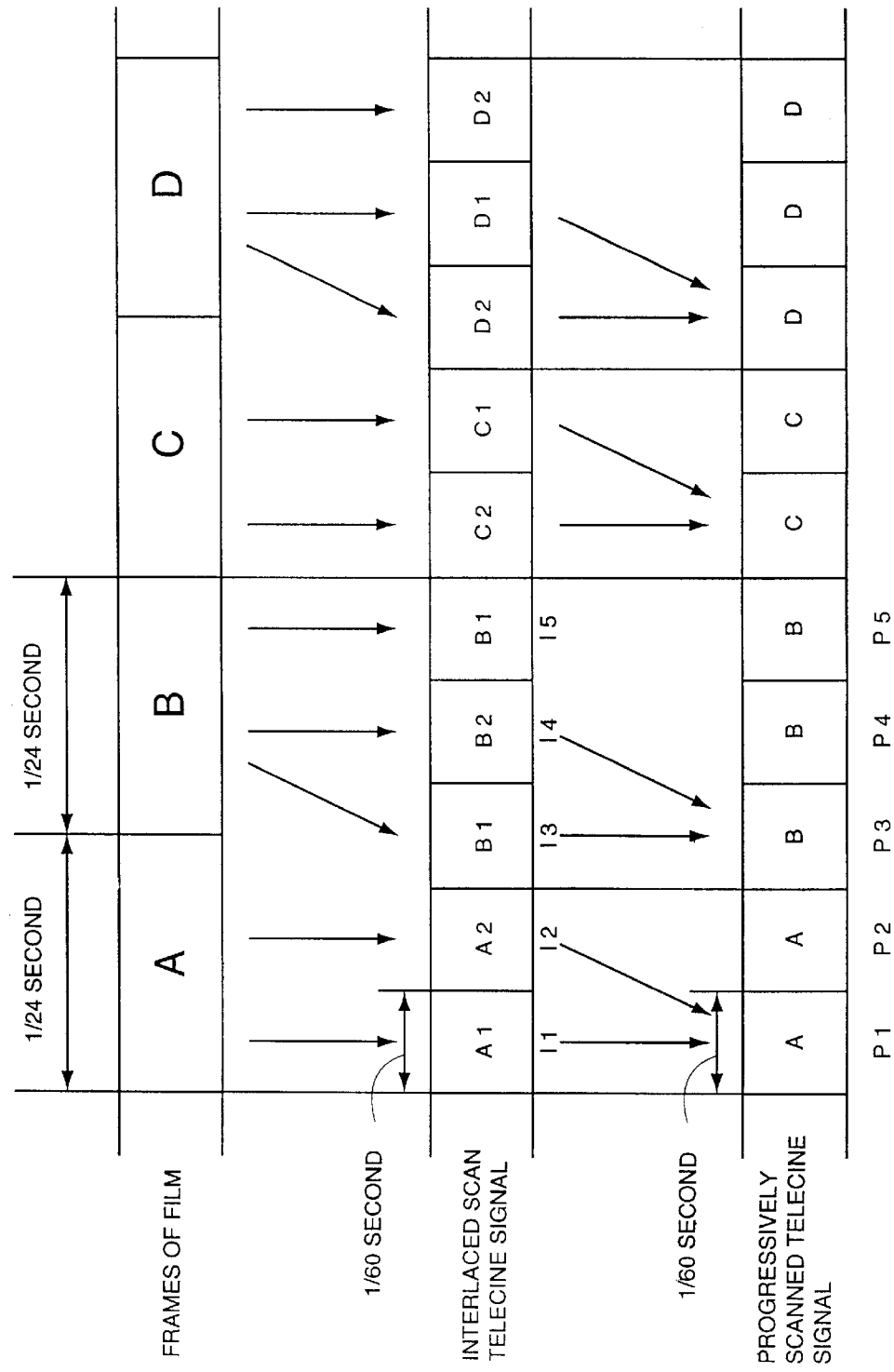
FIG. 1 is a figure for explaining telecine conversion method in the present invention.

Embodiments of the present invention are explained, referring to the drawings.

First, the telecine signal conversion method is explained, referring to FIG. 1.

The telecine signal conversion method of the present invention converts an interlaced scan telecine signal into a progressively scanned telecine signal at broadcasting station.

An interlaced scan telecine signal generated from consecutive frames A, B, C, D . . . of the film by the 2-3 pull-down system explained in the prior art is shown in FIG. 1. One field of the interlaced scan telecine signal comprises 1/60 second and a picture comprising two frames is converted into a picture comprising five fields.

For example, picture information A of the first frame is converted into an odd scanning line signal A1 of the picture information A of the first field I1 and an even scanning line signal A2 of the picture information A of the second field I2. Next, picture information B of the second frame is converted into an odd scanning line signal B1 of the picture information B of the third field I3, an even scanning line signal B2 of the picture information B of the fourth I4 and an interlaced odd scanning line signal B1 of the picture information B of the fifth field I5.

In this embodiment, an interlaced scan telecine signal generated in this way is converted in sequence into a progressively scanned telecine signal per five-field sequence.

Figure 2:
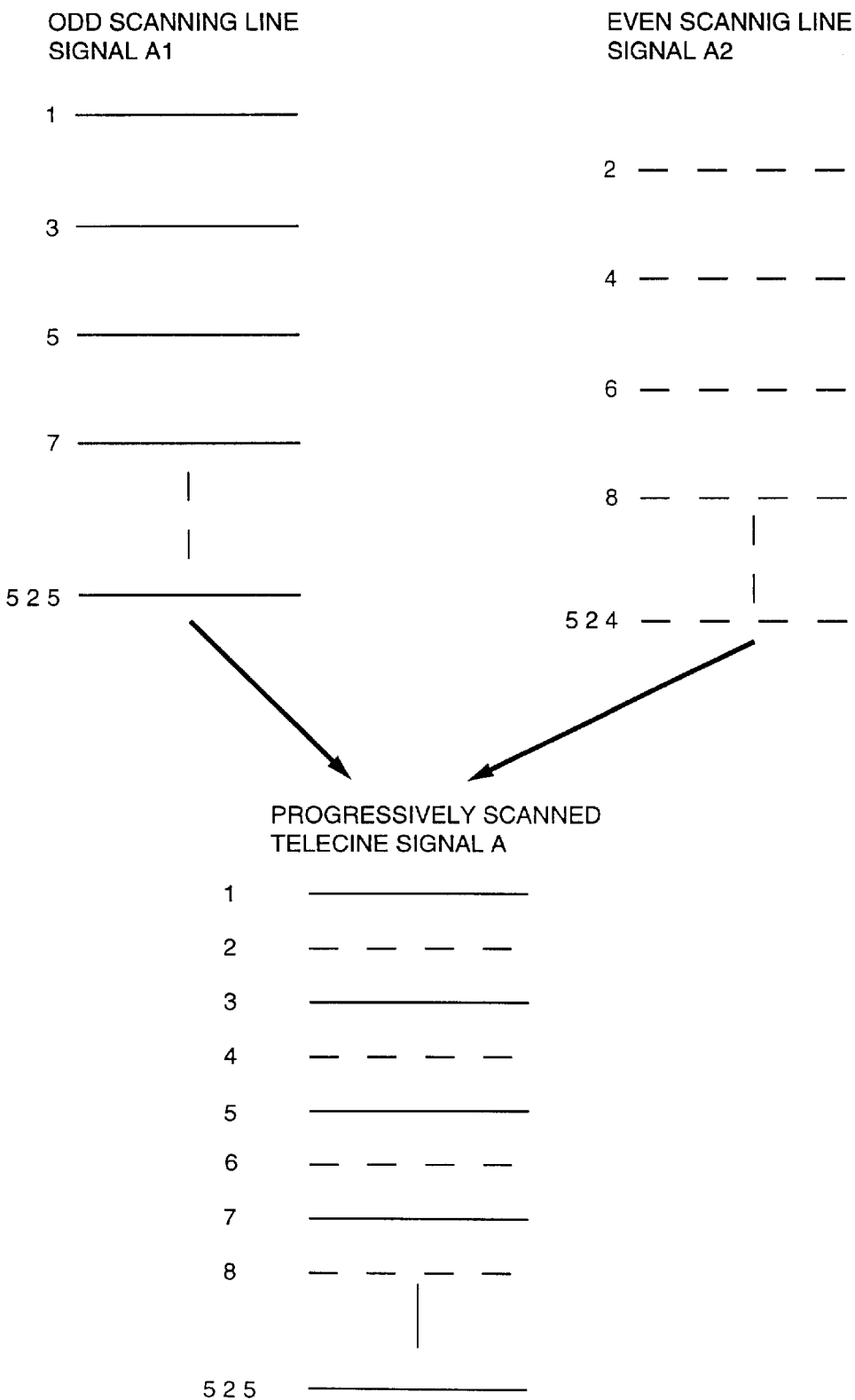
FIG. 2 is a figure for explaining telecine conversion method in the present invention.

For example, as shown in FIG. 2, the odd scanning line signal A1 of the first field I1 and the even scanning line signal A2 of the second field I2 are composed and made into the scanning line signal A of the first frame P1 of the progressively scanned telecine signal. The scanning line signal A is also used as a scanning line signal of the second frame P2.

Moreover, the odd scanning line signal B1 of the third field I3 and the even scanning line signal B2 of the fourth field I4 are composed and made into the scanning line signal B of the third frame P3 of the progressively scanned telecine signal. The scanning line signal B is also used as a scanning line signal of the fourth and fifth frames P4 and P5.

The above processing requires five-field sequence, that is, to obtain a pull-down phase.

Figure 3:
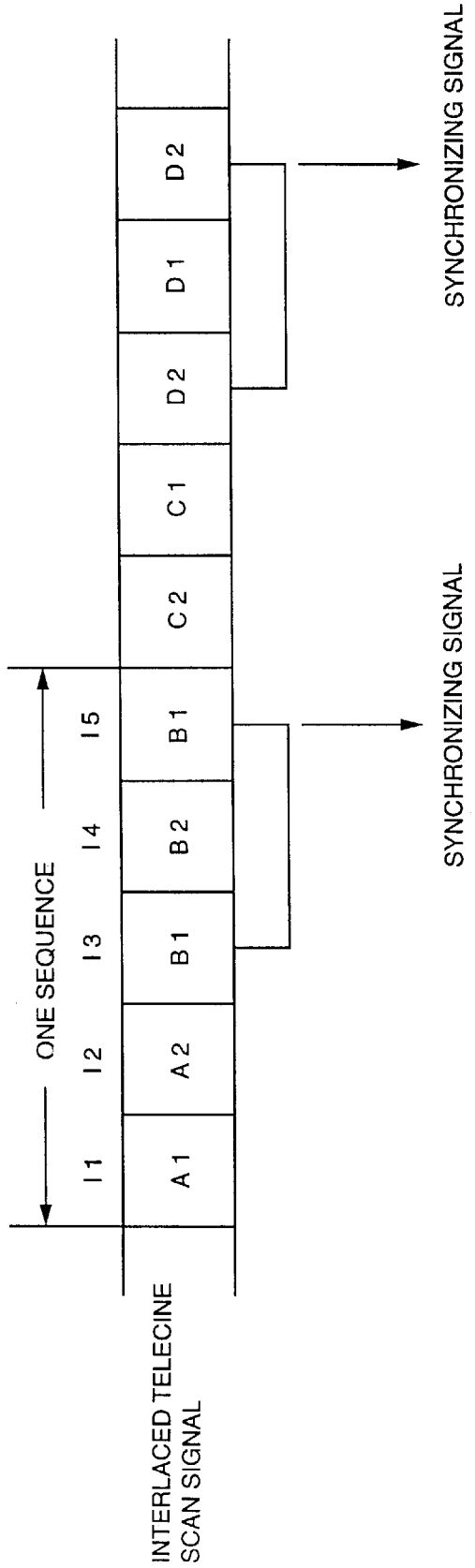
FIG. 3 is a figure for explaining a synchronizing signal synchronized with a pull-down phase.

To obtain a pull-down phase, as shown in FIG. 3, a difference between the present field and two fields before is calculated. When the difference is smaller than a certain threshold, for example, the difference is zero, a pulse (a synchronizing signal) is generated in order to detect a pull-down phase. The procedure utilizes the characteristics of the 2-3 pull-down system. That is, in one five-field sequence, picture information on the third and fifth fields is the same therefore the difference between the signals of the third and fifth fields becomes almost zero.

For example, in FIG. 3, the picture signal of the third and fifth fields is B1. Therefore, the difference between the signal in the third field I3 and the signal in the fifth field I5 becomes zero.

When a synchronizing signal is output at the timing when the difference becomes zero by using the above-mentioned characteristics, five-field sequence, that is, a pull-down phase is obtained.

Furthermore, the alternative to the above-mentioned pull-down phase detecting method is the use of a time code value of each field indicated by a time code signal belonging to an interlaced scan telecine signal.

In this method, a time code value corresponding to each field of the interlaced scan telecine signal is counted in sequence and a synchronizing signal is output at intervals of five fields.

Figure 4:
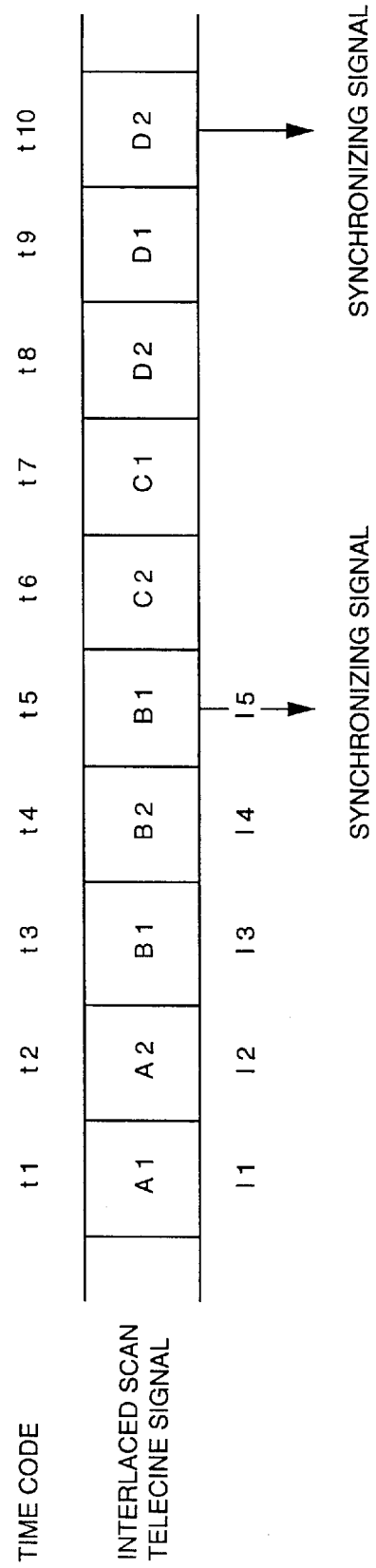
FIG. 4 is a figure for explaining a synchronizing signal synchronized with a pull-down phase.

For example, as shown in FIG. 4, time code values t1, t2, t3, t4 . . . are counted in sequence and a synchronizing signal is output at t5 so that the five-field sequence, that is, the pull-down phase is indicated. However, the count should start at the first field of the sequence so as to obtain a proper pull-down phase. Therefore, the first field is detected by the above-mentioned method using a difference, then a synchronizing signal is generated by the method using a time code value. As a result, a stable pull-down phase is obtained.

Next, an up-converter that performs the above-mentioned method is explained.

Figure 5:
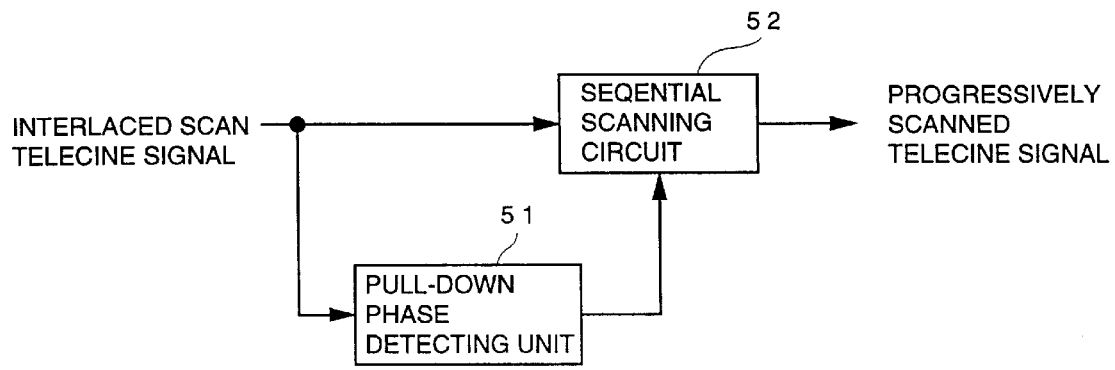
FIG. 5 is a block diagram of the first up-converter in the present invention.

FIG. 5 is a block diagram of the up-converter.

In FIG. 5, the numeral 51 is a pull-down phase detecting unit for outputting a synchronizing signal corresponding to the pull-down phase. The numeral 52 is a sequential scanning circuit for converting an interlaced telecine signal into a progressively scanned signal based on the synchronizing signal.

Figure 6:
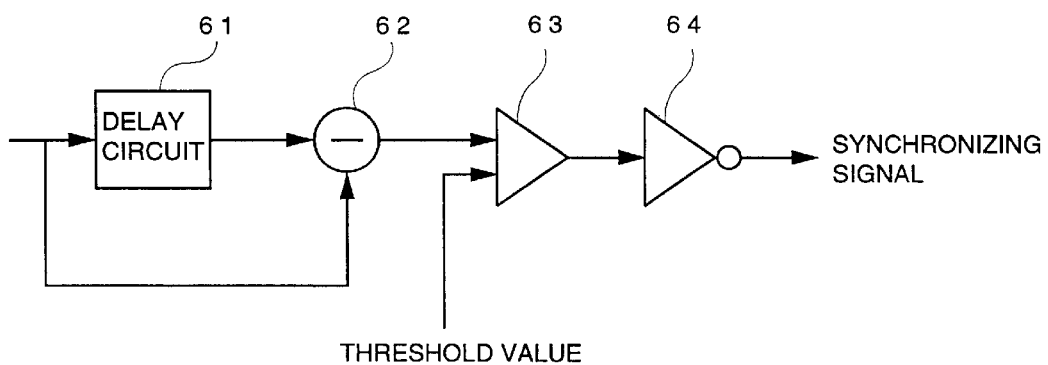
FIG. 6 is a block diagram of the pull-down phase detecting unit in the present invention.

FIG. 6 is a detailed block diagram of the pull-down phase detecting unit.

In FIG. 6, the numeral 61 is a delay circuit. The delay circuit 61 delays the input interlaced scan telecine signal by two fields.

The numeral 62 is a subtraction unit. The subtraction unit 62 obtains a difference value by subtraction between an interlaced scan telecine signal and the interlaced signal delayed by two fields and output from the delay circuit 61. That is, a difference between a signal of a certain field signal and a signal of two fields before the certain field. The difference takes the value of a difference between each picture element of the two fields.

The numeral 63 is a comparator. The comparator 63 compares an output signal (a difference value) of the subtraction unit 62 and a threshold predetermined setting and turn on when the difference is larger. In this case, the comparator turns on when five percent or larger of the picture elements comprise a difference value of the picture elements that is larger than five percent.

The numeral 64 is a reverser for reversing and outputting an output from the comparator 63. Therefore, only when the comparator 63 is off, that is, the difference is smaller than the threshold, a synchronizing signal is output.

In this way, the pull-down detecting unit 51 outputs a synchronizing signal synchronized with the pull-down phase.

Figure 7:
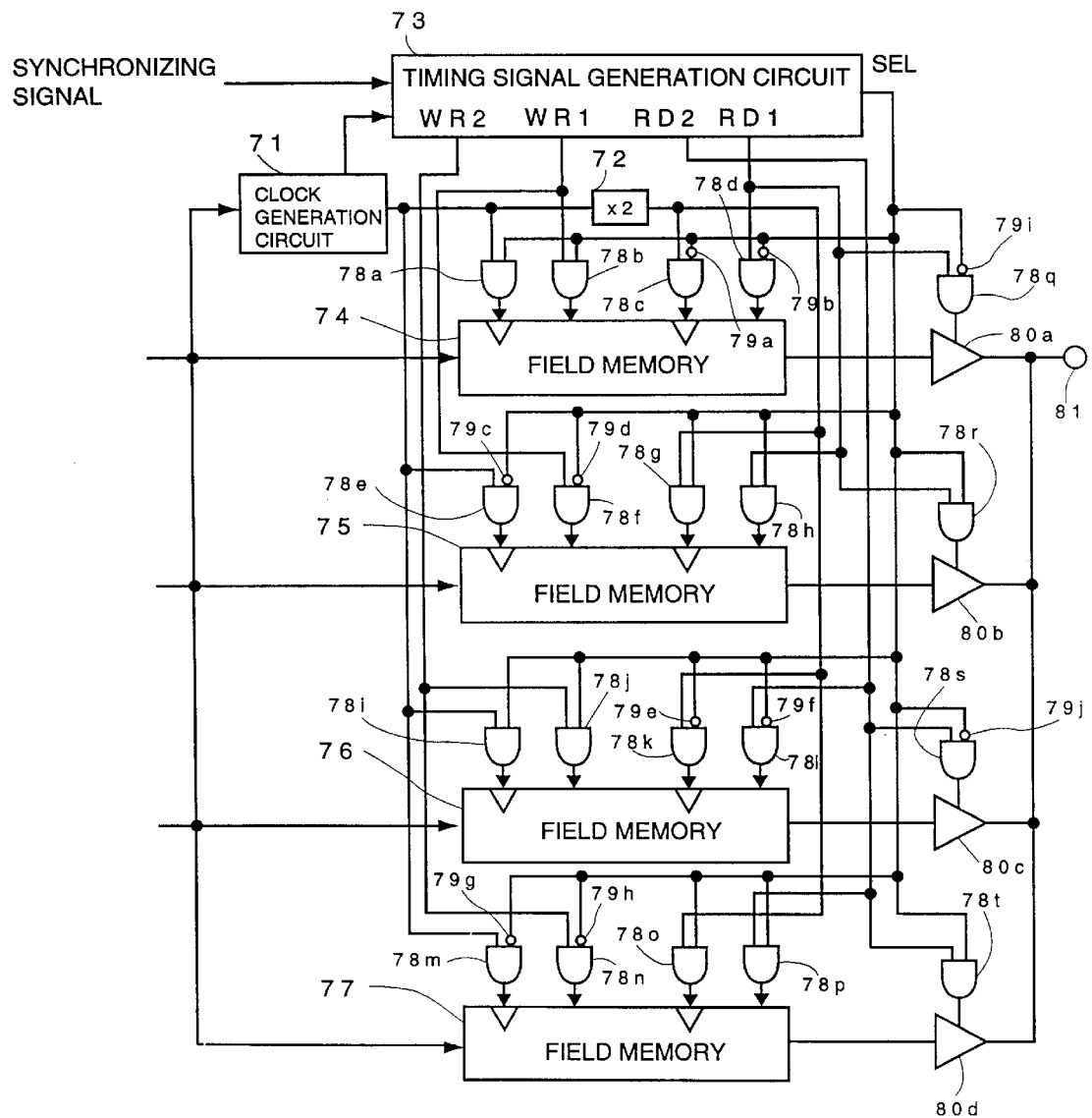
FIG. 7 is a block diagram of the sequential scanning circuit in the present invention.
Figure 8:
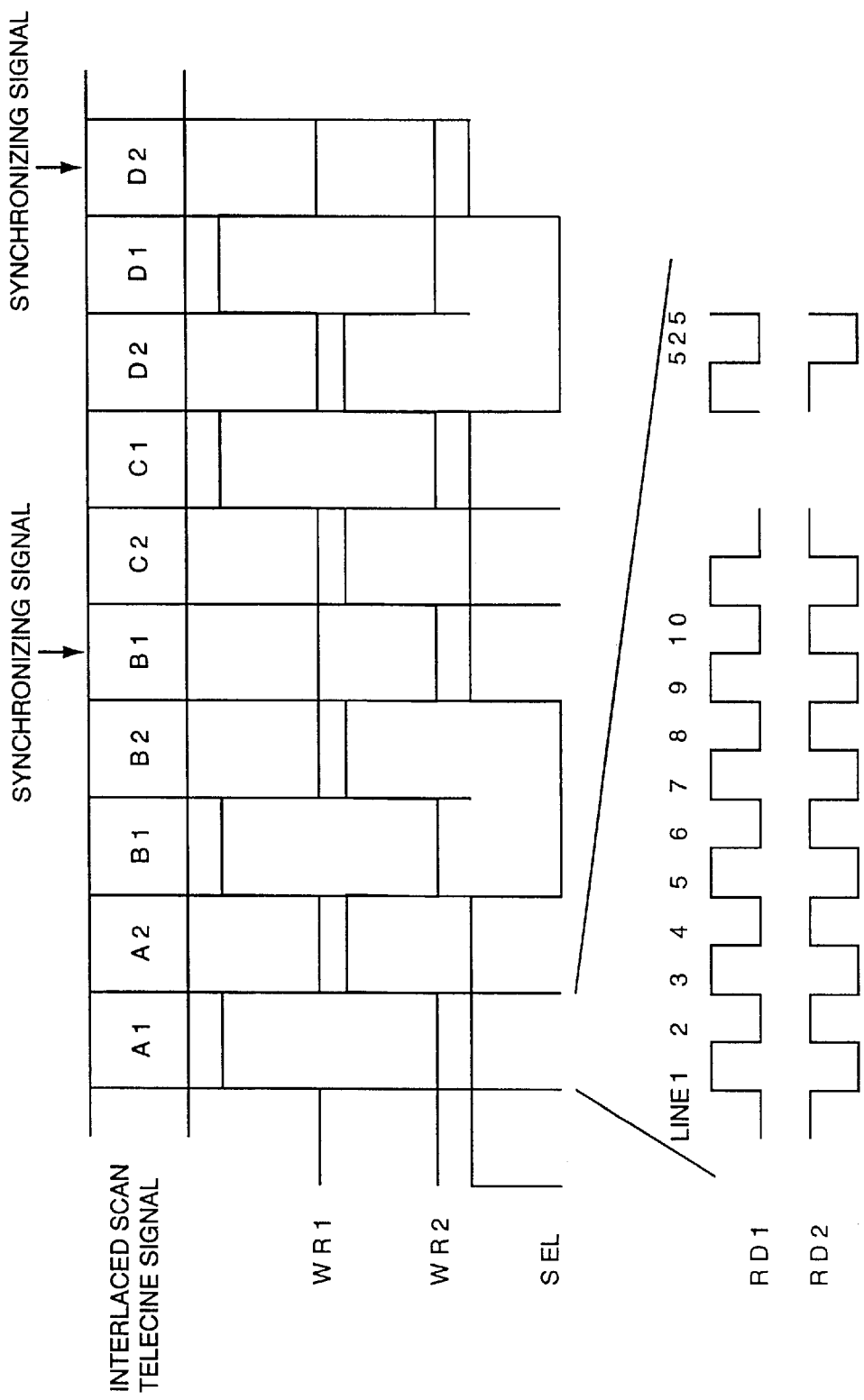
FIG. 8 is a time chart of the sequential scanning circuit.

Next, the sequential scanning circuit 52 is explained in detail. FIG. 7 is a detailed block diagram of the sequential scanning circuit 52 and FIG. 8 is a time chart of the sequential scanning circuit 52.

In FIG. 7, the numeral 71 is a clock generation circuit. The clock generation circuit 71 inputs an interlaced scan telecine signal and generates a write clock synchronized with each picture element of the interlaced scan telecine signal.

The numeral 72 is a clock frequency converter for doubling the rate of a clock generated with the clock generation circuit 71 and generating a read clock.

The numeral 73 is a timing signal generation circuit. The timing signal generation circuit 73 generates write timing signals WR1, WR2 and read timing signals RD1, RD2 of field memories 74, 75, 76, 77 to be described later and an SEL signal for controlling the field memories 74, 75, 76, 77 based on a synchronizing signal between a clock of the clock generation circuit 71 and the pull-down phase detecting unit 51.

The numerals 74, 75 are field memories for storing an odd field signal. In the field memories 74 and 75, an odd field signal among interlaced scan telecine signals is stored at the rate of the write clock according to the timing of the write timing signal WR1 and the SEL signal. Each odd scanning line stored at the rate of the read clock is then read according to the timing of the read timing signal RD1 and the SEL signal.

The numerals 76 and 77 are field memories for storing an even field signal. In the field memories 76 and 77, an even field signal among interlaced telecine signals is stored at the rate of the write clock according to the timing of the write timing signal WR2 and the SEL signal. Each even scanning line stored at the rate of the read clock is then read according to the timing of the read timing signal RD2 and the SEL signal.

The numerals 78a to 78t are AND circuits. The numerals 79a to 79j are reversers. The numerals 80a to 80d are tri-state buffers.

Next, the operation of the sequential scanning circuit 52 is explained, referring to the time chart shown in FIG. 8.

In the first field, the write timing signal WR1 and the SEL signal are set in a high level, therefore the odd scanning line signal A1 is written in the field memory 74. In the second field, the write timing signal WR2 and the SEL signal are set in a high level, the even scanning line signal A2 written in the field memory 76.

In the third field, the write timing signal WR1 is set in a high level and the SEL signal is set in a low level. Therefore, the odd scanning line signal B1 is written in the field memory 75. In the fourth field, the write timing signal WR2 is set in a high level and the SEL signal is set in a low level. Therefore, the even scanning line signal B2 is written in the field memory 77.

In the third field, the SEL signal is set in a low level, therefore the odd scanning line signal A1 written in the field memory 74 is read one by one at the doubled write rate according to the timing of the read timing signal RD1 and output from the tri-state buffer 80a. In the same way, the SEL signal is set in a low level, therefore the even scanning line signal A2 written in the field memory 76 is read one by one at the doubled write rate according to the timing of the read timing signal RD2 and output from the tri-state buffer 80c. As a result, the progressively scanned telecine signal A generated by composing the odd scanning line signal A1 and the even scanning line signal A2 is output from the output terminal 81. At this time the SEL signal is in a low level in two fields, therefore signals for two fields are output in sequence from the field memories 74 and 76. As a result, the progressively scanned telecine signal A is generated from the first and second frames.

The SEL signal is in a high level from the fifth field, therefore the odd scanning line signal B1 written in the field memory 75 is read one by one at the doubled write rate according to the timing of the read timing signal RD1 and output from the tri-state buffer 80*b*. In the same way, the even scanning line signal B2 written in the field memory 77 is read one by one at the doubled write rate according to the timing of the read timing signal RD2 and output from the tri-state buffer 80*d*. As a result, the progressively scanned telecine signal B generated by composing the odd scanning line signal B1 and the even scanning line signal B2 is output from the output terminal 81. The SEL signal is in a high level in three fields, therefore signals for three fields are read from the field memories 75 and 77. As a result, the progressively scanned telecine signal B is generated from the third, fourth and fifth frames.

Next, an up-converter using a time code value in order to stabilize detection of pull-down phase is explained.

Figure 9:
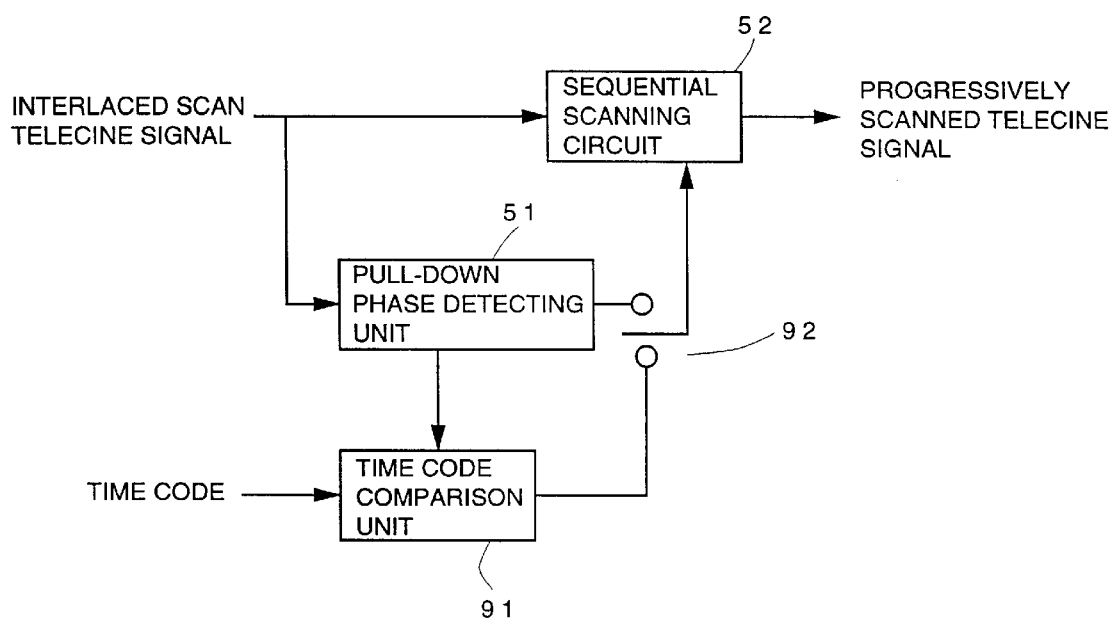
FIG. 9 is a block diagram of the second up-converter in the present invention.

FIG. 9 is a block diagram of the up-converter using a time code value.

In FIG. 9, the pull-down phase detecting unit 51 and the sequential scanning circuit 52 are the same as those in FIG. 5 and are not explained here.

The numeral 91 is a time code comparison unit. The time code comparison unit 91 generates a synchronized stable synchronizing signal synchronized with the pull-down phase by using a synchronizing signal from the pull-down phase detecting unit 51.

The numeral 92 is a switch for switching a synchronizing signal from the pull-down phase detecting unit 51 and a synchronizing signal from the time code comparison unit 91.

Figure 10:
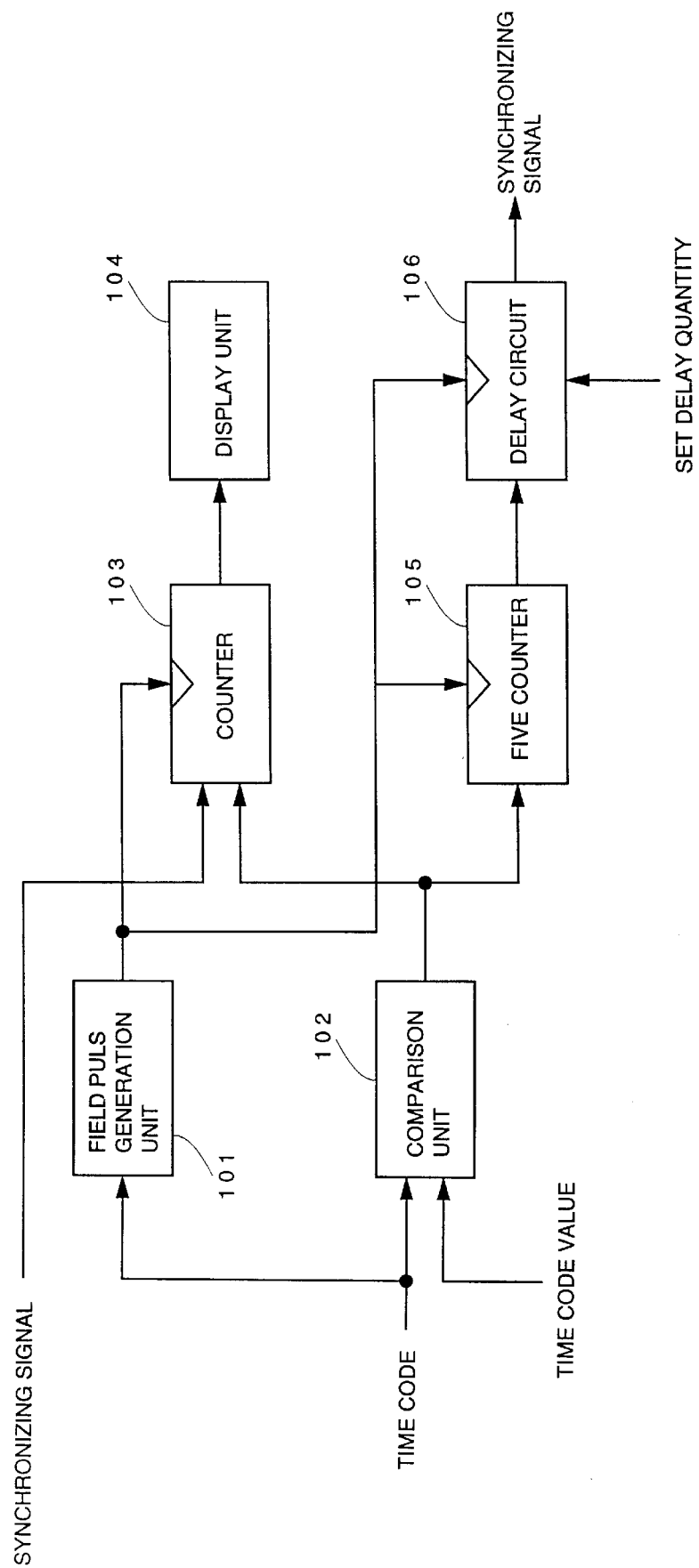
FIG. 10 is a block diagram of the time code comparison unit in the present invention.
Figure 11:
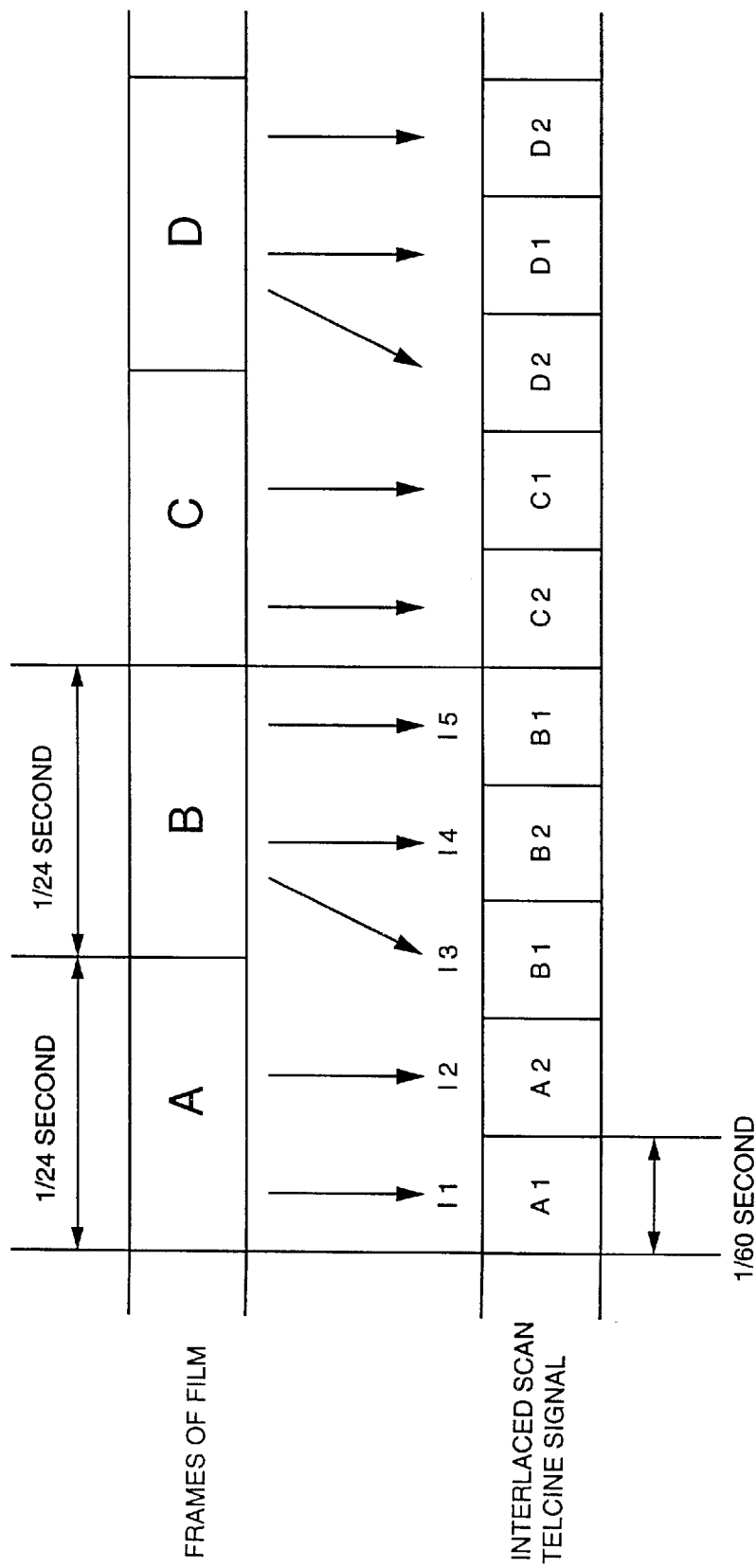
FIG. 11 is a figure for explaining an interlaced scan telecine signal.

The time code comparison unit 91 is explained in details as follows, referring to FIG. 10.

The numeral 101 is a field pulse generation unit.

The field pulse generation unit 101 inputs a time code signal of a interlaced scan telecine signal and generates a field pulse synchronized with the time code value, that is, synchronized with the field of the interlaced scan telecine signal.

The numeral 102 is a comparison unit. The comparison unit 102 compares a time code value shown by the time code signal and a time code value predetermined setting and when the two values become the same, outputs a pulse.

The numeral 103 is a counter. The counter 103 starts count operation by a pulse from the comparison unit 102 and counts a field pulse. The counter 103 then stops the count operation by a synchronizing signal from the pull-down phase detecting unit 51 and outputs the count value.

The numeral 104 is a display unit. The display unit 104 displays a count value output from the counter 103. The displayed count value is the vale of the difference between the timing of the set time code value and the pull-down phase.

The numeral 105 is a five counter. The five counter 105 starts operation by a pulse from the comparison unit 102 and counts a field pulse. The five counter 105 then outputs a pulse at intervals of five fields.

The numeral 106 is a delay circuit. The delay circuit 106 delays a pulse by the set amount of the delay. A value displayed on the display unit 104 is set for the amount of the delay.

Next, the operation of the time code comparison unit 91 described above is explained.

The value three is specified here for a time code value to be set in the comparison unit 102.

First, time code values 1, 2 . . . are input in sequence to the comparison unit 102. When the time code value three is input, the comparison unit 102 outputs a pulse. The counter 103 then starts count operation and counts a field pulse. At this time, when the counter 103 counts the value two, a synchronizing signal from the pull-down phase detecting unit 51 is input. The counter 103 then stops the count operation and outputs the count value to the display unit 104. The display unit 104 then displays the value two.

The value two displayed on the display unit 104 is set in the delay circuit, that is, the delay amount of the delay circuit 106 becomes two.

Simultaneously, the five counter 105 starts count operation by a pulse from the comparison unit 102. Time code values 2, 3, 4, 5, 6 are then displayed in sequence and when the value five is counted, a pulse is output. The pulse from the five counter 105 is delayed by two fields with the delay circuit 106 and output.

A pulse to be output from the delay circuit 106 becomes a signal synchronized with time code values 5, 10, 15 . . . , that is, synchronized with the pull-down phase.

In this way, when the pull-down phase detecting unit 51 is used in a field where a pull-down phase is correctly detected in order to switch to a synchronizing signal synchronized with the time code value by the switch 92, even if a pull-down phase is not correctly detected, for example, a difference other than the difference between a signal of a present field and a signal of two fields before becomes zero like when frames of the same pictures are consecutive, a synchronizing signal synchronized with the pull-down phase is stably obtained.

In this embodiment constructing as the display unit 104 displaying delay quantity and set the delay quantity to delay circuit 106. It can be omit display unit 104, the delay quantity that has been displayed the display unit 104 automaticaly set to delay circuit 106.

In the present invention, an interlaced telecine signal can be converted into a progressively scanned telecine signal without the use of an expensive sequential scanning telecine unit.

What is claimed is:

1. A telecine signal conversion method for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said telecine signal conversion method comprises steps of:
    detecting a pull-down phase of said interlaced scan telecine signal;
    specifying said first and second fields based on said detected pull-down phase, composing picture signals of said specified first and second fields and generating progressively scanned telecine signals from said picture signals of said first and second frames; and
    specifying said third and fourth fields based on said detected pull-down phase, composing picture signals of said specified third and fourth fields and generating progressively scanned telecine signals from said picture signals of said third, fourth and fifth frames;
wherein said detecting step of detecting a pull-down phase of said interlaced scan telecine signal comprises a step of detecting said pull-down phase based on a time code value of said interlaced scan telecine signal.

2. A telecine signal conversion method for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said telecine signal conversion method comprises steps of:
- detecting a pull-down phase of said interlaced scan telecine signal;
- specifying said first and second fields based on said detected pull-down phase, composing picture signals of said specified first and second fields and generating progressively scanned telecine signals from said picture signals of said first and second frames; and
- specifying said third and fourth fields based on said detected pull-down phase, composing picture signals of said specified third and fourth fields and generating progressively scanned telecine signals from said picture signals of said third, fourth and fifth frames;

wherein said detecting step of detecting a pull-down phase of said interlaced scan telecine signal comprises steps of:
- detecting said pull-down phase based on a difference between a picture signal of a certain field of said interlaced scan telecine signal and a picture signal of two fields before said certain field; and
- generating a synchronizing signal synchronized with said detected pull-down phase based on a time code value of said interlaced scan telecine signal and using said phase shown by said synchronizing signal as a new pull-down phase.

3. Telecine signal conversion method for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said telecine signal conversion method comprising steps of:
- detecting said pull-down phase of said interlaced scan telecine signal based on difference between a picture signal of a certain field of said interlaced scan telecine signal and a picture signal of two fields before said certain field;
- generating a synchronizing signal synchronized with said detected pull-down phase based on a time code value of said interlaced scan telecine signal;
- specifying said first and second fields based on said synchronizing signal, composing picture signals of said specified first and second fields and generating progressively scanned telecine signals from said picture signals of said first and second frames; and
- specifying said third and fourth fields based on said synchronizing signal, composing picture signals of said specified third and fourth fields and generating progressively scanned telecine signals from said picture signals of said third, fourth and fifth frames.

4. An up-converter for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said up-converter comprising:
- pull-down phase detecting means for detecting a pull-down phase of said interlaced scan telecine signal and outputting a synchronizing signal synchronized with said pull-down phase;
- means for specifying said first and second fields based on said synchronizing signal, composing picture signals of said specified first and second fields and generating progressively scanned telecine signals from said picture signals of said first and second frames; and
- means for specifying said third and fourth fields based on said synchronizing signal, composing picture signals of said specified third and fourth fields and generating progressively scanned telecine signals from said picture signals of said third, fourth and fifth frames;
- wherein said pull-down phase detecting means comprises generation means for generating a synchronizing signal synchronized with said pull-down phase based on a time code value of said interlaced scan telecine signal.

5. An up-converter for converting an interlaced scan telecine signal generated by 2-3 pull-down system for converting a picture of first frame into an interlaced signal of first and second fields and for converting a picture of second frame following said first frame into an interlaced signal of third, fourth and fifth fields, into a progressively scanned telecine signal, said up-converter comprising:
- pull-down phase detecting means for detecting a pull-down phase of said interlaced scan telecine signal and outputting a synchronizing signal synchronized with said pull-down phase;
- means for specifying said first and second fields based on said synchronizing signal, composing picture signals of said specified first and second fields and generating progressively scanned telecine signals from said picture signals of said first and second frames; and
- means for specifying said third and fourth fields based on said synchronizing signal, composing picture signals of said specified third and fourth fields and generating progressively scanned telecine signals from said picture signals of said third, fourth and fifth frames;
- wherein said pull-down phase detecting means comprises:
  - a subtraction unit for obtaining a difference between a picture signal of a certain field of said interlaced scan telecine signal and a picture signal of two fields before said certain field;
  - pulse outputting means for comparing said difference and a certain threshold value and outputting a pulse when said difference is smaller than said threshold value; and
  - synchronizing signal generation means for generating a synchronizing signal synchronized with said pulse based on a time code value of said interlaced scan telecine signal.

6. The up-converter of claim 5, wherein said synchronizing signal generation means comprises:
- field pulse generation means for generating a field pulse synchronized with a field of an interlaced scan telecine signal;
- means for comparing a time code value shown by a time code signal and a time code value predetermined setting and when said two values become the same, outputting a count start signal;
- a counter for starting count operation of said field pulse by said count start signal and stopping the count operation by a pulse from said pulse outputting means;
- display means for displaying a count value output from said counter;
- a five counter for starting counting said field pulse by said count start signal and outputting a synchronizing signal at intervals of five-field pulses; and delay means for delaying said synchronizing signal by the displayed count value.

7. An up-converter for converting an interlaced scan telecine signal generated by 2-3 pull-down system for converting a picture of the first frame into an interlaced signal of first and second fields and for converting a picture of second frame following said fist frame into an interlaced signal of third, fourth and fifth fields, into a progressively scanned telecine signal, said up-converter comprising:
- a subtraction unit for obtaining a difference between a picture signal of a certain field of said interlaced scan telecine signal and a picture signal of two fields before said certain field;
- pulse outputting means for comparing said difference and a certain threshold value and outputting a pulse when said difference is smaller than said threshold value;
- field pulse generation means for generating a field pulse synchronized with a field of an interlaced scan telecine signal;
- means for comparing a time code value shown by a time code signal and a time code value predetermined setting and when said two values become the same, outputting a count start signal;
- a counter for starting count operation of said field by said count start signal and stopping the count operation by a pulse from said pulse outputting means;
- display means for displaying a count value output from said counter;
- a five counter for starting counting a field pulse by said count start signal and outputting a synchronizing signal at intervals of five-field pulses;
- delay means for delaying said synchronizing signal by the displayed count value;
- means for specifying said first and second fields based on said delayed synchronizing signal, composing picture signals of said specified first and second fields and generating progressively scanned telecine signals from said picture signals of said first and second frames; and
- means for specifying said third and fourth fields based on said delayed synchronizing signal, composing picture signals of said specified third and fourth fields and generating progressively scanned telecine signals from said picture signals of said third, fourth and fifth frames.

* * * * *